United States Patent [19]

Blair et al.

[11] 4,294,746
[45] Oct. 13, 1981

[54] STABILIZERS FOR CYCLOALIPHATIC EPOXIDE CONTAINING COMPOSITIONS

[75] Inventors: Eskel B. Blair, St. Albans; Joseph V. Koleske, Charleston, both of W. Va.

[73] Assignee: Union Carbide Corporation, New York, N.Y.

[21] Appl. No.: 160,287

[22] Filed: Jun. 17, 1980

[51] Int. Cl.$^3$ .................... C08G 59/68; C08G 59/72
[52] U.S. Cl. .................... 260/37 EP; 260/45.9 KA; 260/45.9 KB; 260/42.28; 525/107; 525/122; 525/423; 528/73; 528/361; 528/408; 528/409; 528/416
[58] Field of Search ............... 260/45.9 KA, 45.9 KB, 260/37 EP, 42.28; 525/107, 122, 423; 528/73, 91, 90, 92, 361, 354, 408, 409, 416

[56] References Cited

U.S. PATENT DOCUMENTS

| | | | |
|---|---|---|---|
| 3,080,341 | 3/1963 | Chenicek et al. | 528/361 X |
| 3,379,653 | 4/1968 | Ernst et al. | 528/361 X |
| 3,705,880 | 12/1972 | Matsuo et al. | 528/73 X |
| 3,907,706 | 9/1975 | Robins | 528/90 X |
| 3,998,763 | 12/1976 | Bohnel | 528/361 |
| 4,173,551 | 11/1979 | Crivello | 528/90 X |

FOREIGN PATENT DOCUMENTS 1516351 7/1978 United Kingdom .
1516352 7/1978 United Kingdom .

*Primary Examiner*—Earl A. Nielsen
*Attorney, Agent, or Firm*—Donald M. Papuga

[57] ABSTRACT

Described herein are stabilizers for curable compositions containing cycloaliphatic epoxides and a catalyst. A molded article produced from such a composition possesses high mechanical properties.

26 Claims, No Drawings

STABILIZERS FOR CYCLOALIPHATIC EPOXIDE CONTAINING COMPOSITIONS

This invention is directed to stabilized curable cycloaliphatic epoxide compositions containing a catalyst, and optionally, an hydroxy containing compound. Specifically, when a stabilizing amount of a compound containing a nitrile or an isocyanate group, or a combination thereof, is added to a composition containing a cycloaliphatic epoxide and a catalyst therefore, the molded article prepared from such a composition is clear, transparent, and has high mechanical properties.

In the recently published book "Reaction Injection Molding", edited by Walter E. Becker and published by Van Nostrand Reinhold Company, 1979, reaction injection molding (RIM) is described (on page 1) as involving the injection of a reactive liquid mixture-in most cases polyurethane or polyisocyanurate-into a closed mold where chemical curing and expansion take place. A finished part is removed in 1–10 minutes, depending on the chemical system, the part thickness, and the capabilities of the processing equipment. The resin used in RIM has generally been a polyurethane or polyisocyanurate.

In a recent article titled "Liquid Injection Molding: Where It Stands Today" by A. Emmerich, Plastics Technology, April, 1980, pages 91 to 96, liquid injection molding (LIM) and resin transfer molding (RTM) are discussed. Specifically, on page 92 of this article, LIM is described as generally dealing with reactive formulations that have some degree of pot life and require heated molds to cure rapidly. LIM materials can be supplied in one-component or two-component forms.

RTM, as described in this article, involves pumping reactive resin mixtures into closed molds in which glass-mat reinforcements have been placed.

Polyurethane and polyisocyanurate resins have been used almost exclusively in processes such as RIM. However, these resins have limited mechanical properties. Another disadvantage of using polyurethane resins is that the components must be kept separate since they undergo very rapid reaction when mixed. Thus, the components of the resin can only be used as a two-package system. Further, the stoichiometric ratio of the components must be carefully controlled when preparing the polyurethane, since failure to do so will result in poor chemical or physical properties. Accordingly, efforts are being made to develop resin systems potentially suitable for use in the above molding processes.

Glycidyl epoxy resins have been suggested as potentially suitable for such processes since they react very quickly upon mixing and produce a product with acceptable mechanical properties.

In a publication entitled "Introductory Data Sheet for L-4368 Experimental Low Thermal Energy (LTE) Curative", May, 1978, L-4368 (a catalyst based on $CF_3SO_3H$) is described as a curative designed for catalyzing a wide variety of cationically sensitive, thermosetting resin formulations. This publication states, on page 2, that epoxy resins can either be homopolymerized, reacted with other resin species, or modified to give greater impact resistance by incorporating a simple, low cost polyol with the L-4368 catalyst. Such formulations are described as being cured at high temperatures, i.e., 250°–350° F. and for long periods of time, i.e., 15 minutes. However, such high temperatures and long cure times are not suitable for the processes as described above. Further, the formulations described in this publication are high solids formulations useful as coatings, i.e., thin films of about 1 to 2 mils in thickness, on a wide variety of substrates.

However, this publication does not describe or disclose any formulations suitable for RIM or the processes described above.

When a Bronsted or Lewis acid catalyst, such as $(CF_3SO_3)_nSn$, is used to catalyze the cure reaction of cycloaliphatic epoxy compounds at lower temperatures and for shorter cure times, as required in rapid molding processes, such as RIM, unacceptable articles are formed. For example, when the reaction of an epoxycyclohexane carboxylate with minor amounts of a mixture of ethylene glycol and triethylene glycol was catalyzed by a tin salt of $CF_3SO_3H$ at a temperature of 140° F., and a cure time of 10 minutes, the product had a very low heat distortion temperature. Additionally, the materials were undercured at these low temperatures and short cure times. The use of higher temperatures, more catalyst or an increase in cure time resulted in a more complete or a complete cure of the product. However, the use of such techniques resulted in very brittle, opaque and dark brown appearing products. The products were so brittle, that physical property determination was difficult, if not impossible.

Accordingly, in order to formulate a cycloaliphatic epoxy resin composition which allows the use of high catalyst concentrations and/or short cure times in the curing reaction, a stabilizer or additive is necessary.

THE INVENTION

This invention is directed to a stabilized curable composition comprising a cycloaliphatic epoxide, a Bronsted or Lewis acid catalyst, optionally, an hydroxy containing compound, and a stabilizing amount of a compound containing at least one nitrile and/or isocyanate group.

It has been discovered that stabilizing amounts of compounds containing at least one nitrile and/or isocyanate group stabilizes compositions containing cycloaliphatic epoxides, a Bronsted or Lewis acid catalyst, and optionally, an hydroxy containing compound. When such compounds are used in said cycloaliphatic epoxide containing compositions, cure times of about 10 minutes or less, preferably of about 2 minutes or less, may be achieved at temperatures below about 250° F. The products produced from such compositions are clear, transparent, have a high combination of mechanical properties and can have a high heat distortion temperature. Since the compositions of this invention have short cure times at relatively low temperatures they are particularly suitable for use in rapid injection molding processes, such as RIM. A further advantage of the compositions of this invention is that they can have a longer pot life at room temperature than the components of a polyurethane system so that they can be mixed together and then injection molded. Further, careful control of the stoichiometric component ratios is not needed to achieve good mechanical and chemical properties.

The cycloaliphatic epoxides or polyepoxides that can be used in this invention are well known to those skilled in the art and are fully described in U.S. Pat. Nos. 3,027,357; 2,890,194; and 2,890,197. Of particular interest is that portion of U.S. Pat. No. 3,027,357 beginning at column 4, line 11, to column 7, line 38, which portion and disclosure is specifically incorporated herein by reference. Among some of the specific illustrative diepoxides disclosed herein, one can mention 3,4-epoxycyclohexylmethyl-3,4-epoxycyclohexane carboxylate, bis(3,4-epoxy-6-methylcyclohexylmethyl)adipate, bis(3,4-epoxycyclohexylmethyl)adipate, bis(2,3-epoxycyclopentyl)ether, vinyl cyclohexane diepoxide, 2-(3,4-epoxycyclohexyl)-5,5-spiro(2,3-epoxycyclohexane)-m-dioxane, and the like. The cycloaliphatic diepoxides are preferred. However, minor amounts of other epoxides can be incorporated into the systems. These epoxides include the epoxides obtained by epoxidation of linseed oil, soybean oil, and the like, as well as the glycidyl epoxides of Bis-phenol-A, and the like.

The hydroxy-containing compounds which may be used herein include glycols and polyols. Suitable hydroxy-containing compounds include alkane diols, triols, tetraols, aliphatic ether containing diols, triols, tetraols, cycloaliphatic containing diols, triols, and tetraols, and aromatic containing diols, triols, and tetraols, and the like. Specific illustrations of organic polyols suitable in the practice of this invention include the following: ethylene glycol, diethylene glycol, 2,2,4-trimethyl-1,3-pentanediol, dipropylene glycol, propylene glycol, 2,2-dimethyl-1,3-propanediol, polypropylene glycol having an average molecular weight of about 150 to about 600, and having 2 to 4 terminal hydroxyl groups, triethylene glycol, 1,4-cyclohexanedimethanol, 2,2-dimethyl-3-hydroxypropyl 2,2-dimethyl-3-hydroxypropionate, 1,3-butanediol, tetraethylene glycol, 2,2-bis(4-hydroxphenyl)propane and the ethylene and propylene oxide adducts of 2,2-bis(4-hydroxyphenyl)propane, pentaerythritol, erythritol, glycerine, trimethylolpropane, 1,4-butanediol, 1,6-hexanediol, tripropylene glycol, 2,2-bis(4-hydroxycyclohexyl)propane, 1,2,6-hexanetriol, 1,3-propanediol, the polycaprolactone ester of a polyol in which from about 1 to about 5, preferably from about 1.5 to about 4.0 moles of caprolactone are esterified with a polyol, such as trimethylol propane or diethylene glycol, preferably the polycaprolactone ester of a polyol is the polycaprolactone ester of trimethylol propane in which about 1.5 moles of caprolactone are reacted with trimethylol propane or the polycaprolactone ester of trimethylol propane where about 3.6 moles of caprolactone are esterified with trimethylol propane, and the like. Polycaprolactone polyols are described in U.S. Pat. No. 3,169,945, for example. Also ester diols and ester diol alkoxylates produced by the reaction of an ester diol and an alkylene oxide, as described in U.S. Pat. No. 4,163,114, are suitable for use herein.

The catalysts which are useful in the compositions of this invention are Bronsted or Lewis acids. Specific catalysts that can be mentioned are the stannous salt of trifluorosulfonic acid, diethylammonium salt of trifluorosulfonic acid, trifluorosulfonic acid, boron trifluoride etherate, boron trifluoride amine complexes, and the like. The most preferred catalyst is a stannous salt of trifluorosulfonic acid, $(CF_3SO_3)_2Sn$.

The stabilizer suitable for use in the composition of this invention contains at least one nitrile or isocyanate group, or a combination thereof.

The compounds which contain a nitrile group and are suitable for use in this invention include both monomeric and polymeric compounds. These include acrylonitrile, alkyl nitriles, aromatic nitriles, vinyl nitriles, acetonitrile, methoxyacrylonitrile, 1,5-dicyanopentane (pimelonitrile), isobutyronitrile, 4-phenylbutyronitrile, 2-chloroacrylonitrile, phenyl acetonitrile, hydracrylonitrile, o-tolunitrile, dodecyl nitrile, oleylnitrile, isophthalonitrile, phenyl-sulfonylacetonitrile, styrene/acrylonitrile copolymers, acrylonitrile/butadiene copolymer, and polyacrylonitrile. A preferred nitrile containing compound is 2-ethylhexyl-2-cyano-3,3'-diphenyl acrylate (made by GAF Corporation and sold under the name Unival N539).

Preferably, the nitrile compound is a liquid or soluble and miscible with the components of the composition to ensure that the nitrile compound is uniformly distributed in the composition. If a nitrile compound in the form of a solid is used, it may be necessary to warm the component containing the nitrile compound in order to dissolve the solid or to increase the rate of dissolution.

The isocyanate containing compounds include mono-, di-, or polyfunctional isocyanates, which are well known in the art. Specifically, these isocyanates include 4,4'-diphenylmethane diisocyanate, 4,4'-dicyclohexylmethane diisocyanate, toluene diisocyanate, isophorone diisocyanate, and 1,5-dicyanopentane.

These compounds are used in stabilizing amounts, i.e., from about 0.25 to about 50, preferably, from about 1 to about 20 equivalents of nitrile or from about 1 to about 150, preferably from about 5 to about 150 equivalents of isocyanate, based on the moles of active catalyst.

The compositions of this invention can be prepared by reacting the above-described cycloaliphatic epoxides in the presence of the catalyst and a hydroxyl-containing compound, if used, at a temperature of from about 150 to about 350, preferably, from about 200° to about 300° F. for a period of time ranging from about 0.5 to about 60 preferably from about 1 to about 10 minutes.

The compositions of this invention can be cured neat or in combination with fillers, pigments and/or fibers with a melting point or a transition temperature above about 130° C. such as fiberglass, carbon fibers and aromatic polyamide fibers (such as aramid fibers sold by E. I. duPont de Nemours, Wilmington, Delaware, and sold under the trademark Kevlar), and the like. The cured composition can contain from about 15 to about 75 weight percent of fibers, preferably glass fibers.

Polymeric materials can be prepared from the composition of this invention by the RIM (reaction injection molding) process. In this process, two packages are prepared for subsequent rapid mixing and molding by machine. Various combinations of the materials can be used in either package. For example, one package may comprise the cycloaliphatic epoxide and optionally the hydroxyl-containing compound. The other package may comprise the catalyst and stabilizer. Both packages, when properly formulated, are relatively stable such that they can be stored, shipped and/or sold. At the time of use the packages are rapidly and continuously mixed and then injection molded into the desired shapes. Alternatively, a one package system may be used. In such a system all of the ingredients are mixed and then injection molded.

When cured neat the compositions of this invention are clear and transparent, and have high mechanical properties.

The compositions of this invention are useful for the manufacture of rigid fiber reinforced molded articles. A preferred procedure for producing a molded article from this composition is described in U.S. patent application Ser. No. 135,906 entitled "Molding Process and Apparatus Therefore", and filed on Apr. 14, 1980 in the name of R. Angell, Jr., which is incorporated herein by reference. In this application a process for rapidly fabricating fiber reinforced thermoset resin articles is described. The fiber reinforcement is comprised of one or more fibers with a melting point or a transition temperature above about 130° C. The process comprises the steps of (a) providing one or more fibers with a melting point or a glass transition temperature above about 130° C. in the form of an interlocked mass in a heatable matched metal die mold, (b) providing in an accumulator zone, a liquid body of a thermosettable organic material having a viscosity determined at 120° C., in the absence of curing agent therefore, of less than about 50 centipoise, and which is curable upon heating to a thermoset resin composition, the viscosity of said liquid body being maintained essentially constant in the accumulator zone by keeping its temperature below that at which curing of said material is substantial, (c) closing the mold containing the web, (d) injecting at least a portion of said thermosettable organic material under pressure from said accumulator zone into the mold to thereby fill the cavity in said mold, (e) initiating the curing of said material in said mold by subjecting the material to a temperature above the temperature at which the curing of said material is initiated, by heating the mold, and (f) opening said mold and removing the cured thermoset article therefrom.

In said U.S. patent application Ser. No. 135,906 the apparatus comprises: (a) a heatable matched metal die mold containing one or more cavities therein with means for opening said mold to expose such cavities, and closing the same, and means for controlling the injection of a thermosettable organic liquid to such cavities when the mold is closed, (b) means associated with said mold, whereby one or more fibers in the form of an interlocked mass are provided in a portion of the cavities thereof when the mold is open to expose such cavities and prior to the injection of the thermosettable organic liquid to such cavities when the mold is closed, (c) accumulator means associated with said mold which can contain a thermosettable liquid transportable to means for controlling injection of said liquid to such cavities, (d) cooling means associated with the means for controlling the injection of such liquid to such cavities, whereby the temperature of the liquid in such injection means is maintained substantially below the temperature of the mold.

EXAMPLES

The following examples serve to give specific illustrations of the practice of this invention but they are not intended in any way to limit the scope of this invention.

The following designations are used in the Examples:

| | |
|---|---|
| Desmodur isocyanate | A solvent-free, polyfunctional, aliphatic isocyanate that has an isocyanate content of about 23% and an average equivalent weight of 183 (sold by Mobay Chemical Corporation as Desmodur VP KL5). |
| Epoxide I | 3,4-Epoxycyclohexylmethyl-3,4-epoxycyclohexane carboxylate. |
| Epoxide II | Bis(3,4-epoxycyclohexylmethyl) adipate. |
| Epoxide III | A diglycidyl ether of Bisphenol-A that has a viscosity of 110-150 poise and an epoxide equivalent weight of 185-192 (sold by Shell Chemical Company as Epon 828). |
| Epoxide IV | A polyfunctional epoxide obtained by the epoxidation of linseed oil. |
| | It has an average molecular weight of about 1000 and an oxirane content of at least 9%. |
| Catalyst | A 50% solution of $(CF_3SO_3)_2Sn$ in a 50/50 mixture of water and $C_4H_9O[C_2H_4O]_2H$ (available from Minnesota Mining & Manufacturing Co. as L-4429). |
| Polyol I | A polycaprolactone triol with an average molecular weight of 300 and an average hydroxyl number of 560 (sold by Union Carbide Corporation) |
| Polyol III | A polycaprolactone diol with an average molecular weight of 530 and an average hydroxyl number of 212 (sold by Union Carbide Corporation). |
| Polyol IV | A polycaprolactone triol with an average molecular weight of 540 and an average hydroxyl number of 310 (sold by Union Carbide Corporation). |
| Stabilizer | 2-ethyl-hexyl-2-cyano-3,3'-diphenyl acrylate (sold by General Aniline & Film Corporation as Uvinal N539). |
| Gardner Impact | The ability of a molded plaque to resist rupture from a falling weight. A Gardner Impact Tester is used. The weight is raised to a given height in inches and dropped onto the molded plaque. The inches times the weight (lbs.), designated as in lbs., is recorded at failure. |
| Hardness | ASTM D-2240. |
| Tensile Properties | ASTM D-638. |
| Heat Distortion Temperature | This test was used to obtain an apporximate value for the heat distortion temperature. A strip approximately ¼ inch wide and 5 inches long was cut from a molded plaque. A thermocouple was taped to the center of the plaque which was placed on a variable heat controlled hot plate. As the test specimen was heated, the temperature was recorded on chart paper. The test specimen was flexed occasionally; and when an approximate flex of ¼ inch is obtained, the temperature is noted and recorded as the approximate heat distortion temperature. |

EXAMPLES 1 TO 4

A master batch was prepared by blending the following ingredients in a container at room temperature (about 25° C.): 685 grams of Epoxide 1, 54.3 grams of triethylene glycol and 7.4 grams of ethylene glycol. The amounts of Catalyst and Stabilizer as shown in Table I were added to 50 gram quantities of the master batch. The composition of Control A contained no Stabilizer. The ingredients were mixed at room temperature (about 25° C.) and poured into a glass mold. The glass mold consisted of 1 piece of a double strength glass plate 6×6×0.125 inches and another double strength glass plate 6×7×0.125 inches. A piece of Telflon 0.125×0.25 inches was placed between the two glass plates as a spacer. One glass plate was longer than the other so that it would form a pour area when the mold was placed in an upright position. The mold was placed in an oven heated to 250° F. for the time periods (cure times) shown in Table I. A cured plaque was removed from the oven and tested for hardness and impact strength. The physical appearance of the plaque was also noted.

The results are shown in Table I.

TABLE I

|  | Control A | EXAMPLES 1 | 2 | 3 | 4 |
|---|---|---|---|---|---|
| Catalyst (gms.) | 0.10 | 0.10 | 0.10 | 0.20 | 0.20 |
| Stabilizer (gms.) | — | 0.50 | 1.0 | 1.5 | 2.0 |
| Cure time (min.) | 30 | 30 | 30 | 2 | 2 |
| Hardness | 94 | 94 | 93 | 94 | 93 |
| Impact strength (in.-lbs.) | <5 | 5 | 5 | 10 | 10 |
| Physical appearance | Brown, cracked, bubbles | Clear, transparent, few light yellow streaks | Clear, transparent, light yellow at edges | Clear, transparent, light yellow at edges | Transparent, light yellow color |

The data in Table I show that when no stabilizer was used in the composition (Control A) a poor molded article was obtained. However, when a stabilizer containing a nitrile group is added, the plaques were clear and transparent with good mechanical properties. In Example 4, the molded article had an amber color due to the amber color of the stabilizer since 2.0 grams of stabilizer were used in Example 4. It is noted that in Examples 3 and 4, the mold was preheated to 250° F. in an oven, removed from the oven, the reactants were then placed in the mold and the mold placed in an oven at 250° F. for the indicated cure times.

EXAMPLES 5 TO 9

A master batch was prepared by blending the following ingredients in a container at room temperature (about 25° C.): 685 grams of Expoxide I and 99.6 grams of Polyol I. The amounts of Catalyst and Stabilizer as shown in Table II were added to 50 gram quantities of the master batch. The composition of Control B contained no Stabilizer. The ingredients were mixed at room temperature (about 25° C.) and poured into a glass mold, as described in Examples 1 to 4, preheated to the cure temperatures shown in Table II. The mold was then placed in an oven at the temperatures and cure times shown in Table II. A cured plaque was removed from the oven and tested to determine hardness, impact strength and heat distortion temperature. The physical appearance of the plaque was also noted.

The results are shown in Table II.

ple 5, which is a direct comparison with Control B shows that the use of a stabilizer in the composition produces a clear, transparent article at a long cure time of 30 minutes and 250° F. Examples 6 and 7 show that the composition of this invention can be cured in short periods of time, i.e. for 5 and 4 minutes, respectively and produce an article which is clear and transparent. Example 8 demonstrates that a cure time of 2 minutes at 275° F. using 0.2 grams of catalyst produces a light yellow article which has bubbles. However, Example 9 shows that the use of larger amounts of catalyst, i.e., 0.3 grams and a cure time of 2 minutes at 250° F. produces a clear and transparent article.

EXAMPLES 10 TO 12

The following Controls C to H and Examples 10 to 12 were run in order to ascertain how long a temperature or how short a cure time could be used when the catalyst concentration was varied.

A master batch was prepared by blending the following ingredients in a container at room temperature (about 25° C.): 685 grams of Epoxide I and 99.6 grams of Polyol I. The amounts of Catalyst and Stabilizer as shown in Table III were added to 50 gram quantities of the master batch. The compositions of Controls C to H contained no Stabilizer. The ingredients were mixed at room temperature (about 25° C.) and poured into a glass mold, as described in Examples 1 to 4, preheated to the cure temperature shown in Table III. The mold was then placed in an oven at the temperatures and cure times shown in Table III. A cured plaque was removed from the oven and its physical appearance noted.

The results are shown in Table III.

TABLE II

|  | Control B | EXAMPLE 5 | 6 | 7 | 8 | 9 |
|---|---|---|---|---|---|---|
| Catalyst (gms.) | 0.10 | 0.10 | 0.20 | 0.20 | 0.20 | 0.30 |
| Stabilizer (gms.) | — | 1.5 | 1.5 | 1.5 | 1.5 | 1.5 |
| Cure temperature (°F.) | 250 | 250 | 250 | 250 | 275 | 250 |
| Cure time (mins.) | 30 | 30 | 5 | 4 | 2 | 2 |
| Hardness | 93 | 93 | 94 | 93 | 93 | 94 |
| Impact Strength (in.-lbs.) | 10 | 10 | 5 | 5 | 5 | <5 |
| Heat distortion temp. (°C.) | 150 | 150 | 150 | 150 | 150 | 150 |
| Physical appearance | Dark brown, rigid | Clear, transparent | Clear, transparent | Clear, transparent | Light yellow, bubbles | Clear, transparent |

The data in Table II show that when no stabilizer was used in a composition of epoxide, polyol and catalyst (Control B) the resultant molded article was poor appearing. When a stabilizer is used in the composition as in Examples 5 to 9, according to this invention, the resultant molded article is clear and transparent. Exam- The data in Table III show that when no stabilizer is used (Controls C to H) in the formulation, dark brown plaques are produced. When stabilizer was added to the formulation, in accordance with the present invention, the plaques were transparent and only slightly colored.

TABLE III

| EXAMPLES |
|---|

TABLE III-continued

|  | Control C | Control D | Control E | Control F | Control G |
|---|---|---|---|---|---|
| Catalyst (gms.) | 0.2 | 0.2 | 0.4 | 0.8 | 1.0 |
| Catalyst (%) | 0.4 | 0.4 | 0.8 | 1.6 | 2.0 |
| Stabilizer (gms.) | — | — | — | — | — |
| Stabilizer (%) | — | — | — | — | — |
| Cure time (min.) | 5 | 8 | 10 | 6 | 5 |
| Cure temperature (°F.) | 225 | 200 | 175 | 175 | 175 |
| Physical appearance | Dark brown and full of voids and bubbles. | Partial cure-plaque was very "tender" at the edges, and there were two, large, brown areas near center of plaque. Otherwise, the plaque was clear. | Only partially cured, but was clear and transparent. It was very "tender" at the edges. | Dark brown plaque that was clear at the edges - and was rigid when cooled to room temperature. | Brown plaque that started to turn brown after 2 minutes cure time - it was clear at the edges but was transparent throughout. |

|  | Control H | EXAMPLES 10 | 11 | 12 |
|---|---|---|---|---|
| Catalyst (gms.) | 2.0 | 1.0 | 1.5 | 1.5 |
| Catalyst (%) | 4.0 | 2.0 | 3.0 | 3.0 |
| Stabilizer (gms.) | — | 1.5 | 1.5 | 2.0 |
| Stabilizer (%) | — | 3.0 | 3.0 | 4 |
| Cure time (min.) | 1.5 | 4 | 4 | 4 |
| Cure temperature (°F.) | 175 | 175 | 175 | 175 |
| Physical appearance | Plaque turned black, bubbled, and was full of voids. | Transparent light amber or yellow in color, rigid, and contained only a few minute bubbles. | Light-yellow-colored with two darker amber streaks - it was transparent and rigid. | Light yellow with light brown areas. |

EXAMPLES 13 TO 20

These Examples describe the reaction of Epoxide I (Examples 13 to 17) and Epoxide II (Examples 18 to 20) in the presence of Catalyst and Stabilizer. In each Example the amounts of Catalyst and Stabilizer, as shown in Table IV, were added to 50 gram quantities of the Epoxide. The ingredients were mixed at room temperature (about 25° C.) and poured into a glass mold, as described in Examples 1 to 4, preheated to the cure temperatures shown in Table IV. The mold was then placed in an oven at the temperatures and cure times shown in Table IV. A cured plaque was removed from the oven and its physical appearance noted.

The results are shown in Table IV.

It is noted that in Examples 15 to 17 the Catalyst level was too high for the amount of Stabilizer and the type of epoxide used, resulting in a dark brown appearing plaque. When a different epoxide was used as in Example 20, a transparent light yellow colored plaque was obtained in comparison to Example 15 wherein a dark brown plaque was obtained.

TABLE IV

|  | EXAMPLES | | | | | | | |
|---|---|---|---|---|---|---|---|---|
|  | 13 | 14 | 15 | 16 | 17 | 18 | 19 | 20 |
| Catalyst (gms.) | 0.2 | 0.2 | 0.4 | 0.4 | 0.8 | 0.2 | 0.3 | 0.4 |
| Stabilizer (gms.) | 1.5 | 1.5 | 1.5 | 1.5 | 1.5 | 1.5 | 1.5 | 1.5 |
| Cure time (min.) | 10 | 5 | 3 | 8 | 2 | 10 | 10 | 4 |
| Cure temperature (°F.) | 200 | 250 | 250 | 225 | 225 | 250 | 250 | 250 |
| Physical appearance | Clear, transparent | Clear, transparent | Dark brown, bubbled with voids | Dark brown, bubbled with voids | Dark brown, bubbled with voids | Transparent, rigid, light yellow color | Transparent, rigid, light yellow color | Transparent, rigid, light yellow color |

EXAMPLES 21 TO 29

These Examples describe the reaction of a mixture of epoxides in the presence of Catalyst and Stabilizer. The amount of Epoxide I, Epoxide II, and Epoxide III, Catalyst and Stabilizer used are as shown in Table V. The ingredients were mixed at room temperature (about 25° C.) and poured into a glass mold, as described in Examples 1 to 4, preheated to the cure temperatures shown in Table V. The mold was then placed in an oven at the temperatures and cure times shown in Table V. A cured plaque was removed from the oven and tested to determine hardness, Gardner impact and heat distortion temperature. The physical appearance of the plaque was noted.

The results are shown in Table V.

TABLE V

|  | EXAMPLES | | | | |
|---|---|---|---|---|---|
|  | 21 | 22 | 23 | 24 | 25 |
| Epoxide I (gms.) | 45 | 40 | 30 | 20 | 15 |
| Epoxide II (gms.) | 5 | 10 | 20 | 30 | 35 |
| Epoxide III (gms.) | 0 | 0 | 0 | 0 | 0 |
| Catalyst (gms.) | 0.4 | 0.8 | 0.8 | 0.8 | 0.6 |

TABLE V-continued

| | | | | | |
|---|---|---|---|---|---|
| Stabilizer (gms.) | 1.5 | 1.5 | 1.5 | 1.5 | 1.5 |
| Cure time (min.) | 9 | 10 | 8 | 8 | 10 |
| Cure temperature (°F.) | 225 | 225 | 200 | 200 | 200 |
| Hardness | 95 | 94 | 93 | 93 | 92 |
| Gardner impact (in.-lbs.) | <4 | <4 | <4 | 5 | 5 |
| Heat Distortion Temp. (°C.) | 160 | 160 | 160 | 150 | 140 |
| Physical appearance | Light yellow tint, transparent. | Light yellow tint, transparent. | Light yellow color except for center section which was light brown. It was transparent. | Light yellow color except for center section which was light brown. It was transparent. | Light yellow color with two darker yellow areas. It was transparent. |

| | EXAMPLES | | | |
|---|---|---|---|---|
| | 26 | 27 | 28 | 29 |
| Epoxide I (gms.) | 10 | 5 | 40 | 47.5 |
| Epoxide II (gms.) | 40 | 45 | 0 | 0 |
| Epoxide III (gms.) | 0 | 0 | 10 | 2.5 |
| Catalyst (gms.) | 0.6 | 0.6 | 0.6 | 0.6 |
| Stabilizer (gms.) | 1.5 | 1.5 | 1.5 | 1.5 |
| Cure time (min.) | 10 | 10 | 10 | 10 |
| Cure temperature (°F.) | 200 | 200 | 200 | 200 |
| Hardness | 90 | 90 | 88 | 94 |
| Gardner impact (in.-lbs.) | 4 | <4 | <4 | <4 |
| Heat Distortion Temp. (°C.) | 125 | 110 | 50 | 150 |
| Physical appearance | Light yellow with brown streaks throughout. It was transparent. | Light yellow and transparent. | Light yellow and transparent. | Light yellow, transparent, and contained a few light brown specks. |

EXAMPLES 30 TO 37

The following master batch was prepared for Examples 30 to 34 and Control I by blending the following ingredients in a container at room temperature (about 25° C.): 685 grams of Epoxide I, 99.6 grams of Polyol I. For Examples 35 to 37 and Control J, the following master batch was prepared by blending the following ingredients at room temperature (about 25° C.): 685 grams of Epoxide I, 54.3 grams of triethylene glycol and 7.4 grams of ethylene glycol.

In each Example the amounts of Catalyst and Stabilizer shown in Table VI were added to 50 gram quantities of the respective master batch. The ingredients were mixed at room temperature (about 25° C.) and poured into a glass mold, as described in Examples 1 to 4, preheated to the cure temperature shown in Table VI. The mold was then placed in an oven at the temperatures and cure times shown in Table VI. A cured plaque was removed from the oven and tested to determine tensile strength, elongation and secant modulus. (The values of the tensile properties shown in the Table are an average of three values.) The physical appearance of the plaque was also noted.

The results are shown in Table VI.

TABLE VI

| | EXAMPLES | | | | |
|---|---|---|---|---|---|
| | 30 | 31 | 32 | Control I[a] | 33 |
| Catalyst (gms.) | 0.2 | 0.2 | 0.2 | 0.2 | 1.0 |
| Stabilizer (gms.) | 1.5 | 1.0 | 0.5 | 0 | 1.5 |
| Cure time (min.) | 3 | 3 | 3 | 3 | 3 |
| Cure temperature (°F.) | 250 | 250 | 250 | 250 | 175 |
| Tensile strength (psi) | 6800 | 5200 | 7200 | — | 6000 |
| Elongation (%) | 1.5 | 1.3 | 1.7 | — | 1.4 |
| 1% Secant modulus (psi × $10^5$) | 4.8 | 4.3 | 4.7 | — | 4.5 |
| Physical appearance | Slight yellow tint, clear, transparent, and rigid. | Very light yellow and clear. | Light brown in color with a few amber streaks. | Dark brown and full of voids and bubbles. | Light yellow with two brown streaks. |

| | EXAMPLES | | | | |
|---|---|---|---|---|---|
| | 34 | 35 | 36 | Control J[a] | 37 |
| Catalyst (gms.) | 0.2 | 0.2 | 0.2 | 0.2 | 0.2 |
| Stabilizer (gms.) | 1.5 | 1.5 | 1.0 | 0 | 1.5 |
| Cure time (min.) | 15 | 2 | 2 | 2 | 15 |
| Cure temperature (°F.) | 250 | 250 | 250 | 250 | 250 |
| Tensile strength (psi) | 4500 | 6200 | 5400 | — | 7900 |
| Elongation (%) | 1.1 | 1.4 | 1.2 | — | 1.8 |
| 1% Secant modulus (psi × $10^5$) | 4.3 | 4.6 | 4.8 | — | 4.7 |
| Physical appearance | — | Light yellow color, clear, transparent, and rigid. | Light yellow and brown, Brown areas had many bubbles and voids. | Dark brown and full of voids and bubbles. | — |

[a]The poor quality of the plaque precluded determination of its physical properties.

EXAMPLES 38 TO 43

These Examples demonstrate the use of acrylonitrile as a stabilizer for the composition.

A master batch was prepared by blending the following ingredients at room temperature (about 25° C.): 685 grams of Epoxide I and 99.6 grams of Polyol I. The amounts of Catalyst and acrylonitrile as shown in Table VII were added to 50 gram quantities of the master batch. The ingredients were mixed at room temperature (about 25° C.) and poured into a glass mold, as described in Examples 1 to 4, preheated to the cure temperatures shown in Table VII. The mold was then placed in an oven at the temperatures and cure times shown in Table VII. A cured plaque was removed from the mold. The plaque was tested to determine hardness, Gardner impact and heat distortion temperature. The physical appearance of the plaque was also noted.

The results are shown in Table VII.

These Examples show that the color and transparency of the plaque can be controlled by the amount of stabilizer used. In addition, Example 38 demonstrates that the use of excessive stabilizer results in an undercured plaque at the given temperature.

room temperature (about 25° C.) and poured into a glass mold, as described in Examples 1 to 4, preheated to the cure temperatures shown in Table VIII. The mold was then placed in an oven at the temperatures and cure times shown in Table VIII. A cured plaque was removed from the mold. The physical appearance of the plaque was noted.

The results are shown in Table VIII.

It is noted that the plaque formed from the composite of Example 44 was flexible and appeared to have a heat distortion temperature below room temperature. The acetonitrile did stabilize the system and prevent color formation. In Example 47, the physical appearance of the plaque was due to the use of a high cure temperature, i.e. 350° F.

TABLE VIII

|  | EXAMPLES | | | |
| --- | --- | --- | --- | --- |
|  | 44 | 45 | 46 | 47 |
| Catalyst (gms.) | 0.2 | 0.2 | 0.2 | 0.2 |
| Acetonitrile (gms.) | 0.17 | 0.09 | 0.10 | 0.10 |
| Acetonitrile (%) | 0.34 | 0.18 | 0.20 | 0.20 |
| Cure time (min.) | 3 | 3 | 3 | 1 |
| Cure temperature (°F.) | 250 | 250 | 250 | 350 |
| Physical appearance | Clear and colorless. | Clear but had a few light yellow spots. | Clear and transparent. | Light brown in color and full of bubbles and voids. |

EXAMPLES 48 TO 56

These Examples demonstrate the use of various nitrile containing compounds as stabilizer.

A master batch was prepared by blending the following ingredients in a container at room temperature (about 25° C.): 685 grams of Epoxide I and 99.6 grams of Polyol I. The amounts of Catalyst, the type of nitrile containing compounds and amounts thereof, as shown in Table IX, were added to 50 gram quantities (Examples 48 and 49) and to 25 gram quantities (Examples 50

TABLE VII

|  | EXAMPLES | | |
| --- | --- | --- | --- |
|  | 38 | 39 | 40 |
| Catalyst (gms.) | 0.2 | 0.2 | 0.2 |
| Acrylonitrile (gms.) | 0.5 | 0.1 | 0.05 |
| Acrylonitrile (%) | 1.0 | 0.2 | 0.1 |
| Cure time (min.) | 5 | 3 | 3 |
| Cure temperature (°F.) | 250 | 250 | 250 |
| Hardness | 10 | 94 | 94 |
| Gardner Impact (in.-lbs.) | >4 | >4 | 4 |
| Heat Distortion Temp. (°C.) | 25 | 150 | 150 |
| Physical Appearance | Clear and transparent-semi-rigid in nature. It did not appear to be fully cured. | Light yellow in color, clear, transparent, and rigid. | Dark amber in color and transparent. About one-half of the plaque contained voids and bubbles. |

|  | EXAMPLES | | |
| --- | --- | --- | --- |
|  | 41 | 42 | 43 |
| Catalyst (gms.) | 0.2 | 0.25 | 0.2 |
| Acrylonitrile (gms.) | 0.08 | 0.2 | 0.25 |
| Acrylonitrile (%) | 0.16 | 0.4 | 0.5 |
| Cure time (min.) | 3 | 3 | 3 |
| Cure temperature (°F.) | 250 | 250 | 250 |
| Hardness | 94 | 94 | — |
| Gardner Impact (in.-lbs.) | >4 | 5 | — |
| Heat Distortion Temp. (°C.) | — | 150 | — |
| Physical Appearance | Dark and transparent. It contained air bubbles and voids. | Clear, but the edges were light yellow in color. It had a few bubbles in the top section. | Very light yellow color, transparent, and rigid. It did not contain bubbles or voids. |

EXAMPLES 44 TO 47

These Examples demonstrate the use of acetonitrile as a stabilizer for the composition.

A master batch was prepared by blending the following ingredients in a container at room temperature (about 25° C.): 685 grams of Epoxide I and 99.6 grams of Polyol I. The amounts of Catalyst and acetonitrile as shown in Table VIII were added to 50 gram quantities of the master batch. The ingredients were mixed at to 56), respectively, of master batch. The ingredients were mixed at room temperature (about 25° C.) and poured into a glass mold, as described in Examples 1 to 4, preheated to the cure temperatures shown in Table IX. The mold was then placed in an oven at the temperatures and cure times shown in Table IX. A cured plaque was removed from the mold. The physical appearance of the plaque was noted.

The results are shown in Table IX.

It is noted that in Examples 55 when 0.125 grams of 2-chloroacrylonitrile stabilizer was used in the composition, a plaque molded from such a composition was dark brown and full of bubbles and voids. However, when the amount of 2-chloroacrylonitrile was raised to 1.25 grams, the plaque molded from such a composition was yellow and transparent and did not contain voids or bubbles.

A master batch was prepared by blending the following ingredients in a container at room temperature (about 25° C.): 685 grams of Epoxide I and 99.6 grams of Polyol I. The amounts of Catalyst, the type of nitrile containing compounds and amounts thereof, as shown in Table X, were added to 25 gram quantities of master batch. The ingredients were mixed at room temperature (about 25° C.) and poured into a glass mold as described in Examples 1 to 4, preheated to the cure temperatures shown in Table X. The mold was then placed in an oven at the temperatures are cure times shown in Table X. A cured plaque was removed from the mold. The physical appearance of the plaque was noted.

The results are shown in Table X.

It is noted that in Example 64 when 0.125 grams of oleyl nitrile stabilizer was used in the composition, a plaque molded from such a composition was dark yel-

TABLE IX

| | EXAMPLES | | | | |
|---|---|---|---|---|---|
| | 48 | 49 | 50 | 51 | 52 |
| Catalyst (gms.) | 0.2 | 0.2 | 0.1 | 0.1 | 0.1 |
| Benzonitrile (gms.) | 0.2 | 0.75 | — | — | — |
| Methoxyacrylonitrile (gms.) | — | — | 0.25 | — | — |
| 1,5-Dicyanopentane (gms.) | — | — | — | 0.06 | 0.125 |
| Isobutyronitrile (gms.) | — | — | — | — | — |
| 4-Phenylbutyronitrile (gms.) | — | — | — | — | — |
| 2-Chloroacrylonitrile (gms.) | — | — | — | — | — |
| Cure time (min.) | 3 | 3 | 3 | 3 | 3 |
| Cure temperature (°F.) | 250 | 250 | 250 | 250 | 250 |
| Physical appearance | Transparent, clear and rigid | Transparent, clear and rigid | Transparent, clear and rigid | Transparent, clear and rigid | Transparent, clear and semi-rigid |

| | EXAMPLES | | | |
|---|---|---|---|---|
| | 53 | 54 | 55 | 56 |
| Catalyst (gms.) | 0.1 | 0.1 | 0.1 | 0.1 |
| Benzonitrile (gms.) | — | — | — | — |
| Methoxyacrylonitrile (gms.) | — | — | — | — |
| 1,5-Dicyanopentane (gms.) | — | — | — | — |
| Isobutyronitrile (gms.) | 0.125 | — | — | — |
| 4-Phenylbutyronitrile (gms.) | — | 0.125 | — | — |
| 2-Chloroacrylonitrile (gms.) | — | — | 0.125 | 1.25 |
| Cure time (min.) | 3 | 3 | 3 | 3 |
| Cure temperature (°F.) | 250 | 250 | 250 | 250 |
| Physical appearance | Transparent, clear and rigid | Transparent, clear and rigid | Dark brown, full of bubbles and voids | Yellow and transparent. Did not contain voids or bubbles |

EXAMPLES 57 TO 65

These Examples demonstrate the use of various nitrile containing compounds as stabilizers.

low, transparent and contained voids and bubbles. However, when the amount of this stabilizer was increased to 0.25 grams in the composition, a plaque molded from such a composition was transparent, clear and rigid.

TABLE X

| | EXAMPLES | | | | |
|---|---|---|---|---|---|
| | 57 | 58 | 59 | 60 | 61 |
| Catalyst (gms.) | 0.1 | 0.1 | 0.1 | 0.1 | 0.1 |
| Phenylacetonitrile (gms.) | 0.125 | 0.19 | — | — | — |
| Hydracrylonitrile (gms.) | — | — | 0.125 | — | — |
| o-Tolunitrile (gms.) | — | — | — | 0.125 | 0.25 |
| Dodecyl nitrile (gms.) | — | — | — | — | — |
| Oleyl nitrile (gms.) | — | — | — | — | — |
| Cure time (min.) | 3 | 3 | 3 | 3 | 5 |
| Cure temperature (°F.) | 250 | 250 | 250 | 250 | 250 |
| Physical appearance | Light yellow, transparent, rigid | Transparent, clear, rigid | Transparent, clear, rigid | Dark yellow, rigid, transparent | Transparent, clear, rigid |

| | EXAMPLES | | | |
|---|---|---|---|---|
| | 62 | 63 | 64 | 65 |
| Catalyst (gms.) | 0.1 | 0.1 | 0.1 | 0.1 |

TABLE X-continued

| | | | | |
|---|---|---|---|---|
| Phenylacetonitrile (gms.) | — | — | — | — |
| Hydracrylonitrile (gms.) | — | — | — | — |
| o-Tolunitrile (gms.) | — | — | — | — |
| Dodecyl nitrile (gms.) | 0.25 | 0.41 | — | — |
| Oleyl nitrile (gms.) | — | — | 0.125 | 0.25 |
| Cure time (min.) | 3 | 3 | 3 | 3 |
| Cure temperature (°F.) | 250 | 250 | 250 | 250 |
| Physical appearance | Transparent, clear, rigid | Transparent, clear, rigid | Dark yellow, transparent and contained voids and bubbles | Transparent clear, rigid |

EXAMPLES 66 TO 70

These Examples demonstrate the use of various nitrile containing compounds as stabilizers.

A master batch was prepared by blending the following ingredients at room temperature (about 25° C.): 685 grams of Epoxide I and 99.6 grams of Polyol I. The type and amount of nitrile shown in Table XI was added to 25 grams of the master batch and heated to 130° C. with stirring for a sufficient time to solubilize the nitrile which was a crystalline solid. The blend was then cooled to room temperature (25° C.). The amount of Catalyst as shown in Table XI was then added to the blend.

The ingredients were mixed at room temperature (about 25° C.) and poured into a glass mold, as described in Examples 1 to 4, preheated to the cure temperatures shown in Table XI. The mold was then placed in an oven at the temperatures and cure times shown in Table XI. A cured plaque was removed from the mold. The physical appearance of the plaque was noted.

The results are shown in Table XI.

TABLE XI

| | EXAMPLES | | | | |
|---|---|---|---|---|---|
| | 66 | 67 | 68 | 69 | 70 |
| Catalyst (gms.) | 0.1 | 0.1 | 0.1 | 0.1 | 0.1 |
| Isophthalonitrile (gms.) | 0.19 | 0.50 | 0.75 | — | — |
| Phenylsulfonylnitrile (gms.) | — | — | — | 0.25 | 1.25 |
| Cure time (min.) | 3 | 3 | 3 | 3 | 3 |
| Cure temperature (°F.) | 250 | 250 | 250 | 250 | 250 |
| Physical appearance | Brown, transparent full of voids and bubbles | Light yellow color, transparent. One half contained voids and bubbles | Clear, transparent, rigid | Brown, many voids and bubbles | Yellow, transparent, rigid |

EXAMPLES 71 TO 73

These Examples demonstrate the use of a polymeric acrylonitrile containing polyol as a stabilizer.

A master batch was prepared by blending the following ingredients at room temperature (about 25° C.): 685 grams of Epoxide I and 99.6 grams of Polyol I. The amounts of Catalyst shown in Table XII and the amounts of stabilizer, i.e., a copolymer of butadiene and acrylonitrile with a viscosity of 453 poise (30° C.) and a hydroxyl value of 0.52 milliequivalents of KOH per gram of polyol (POLY bd CN-15, sold by Arco Chemical Company), shown in Table XII, were added to 25 gram quantities of master batch. The ingredients were mixed at room temperature (about 25° C.) and poured into a glass mold, as described in Examples 1 to 4, preheated to the cure temperature shown in Table XII. The mold was then placed in an oven at the temperatures and cure times shown in Table XII. A cured plaque was removed from the mold and tested to determine hardness, Gardner impact, and heat distortion temperature. The physical appearance of the plaque was noted.

The results are shown in Table XII.

The data in the Table shows that increasing the amount of stabilizer results in a composition which can be molded into a plaque which is clear, transparent and rigid.

TABLE XII

| | 71 | 72 | 73 |
|---|---|---|---|
| Catalyst (gms.) | 0.1 | 0.1 | 0.1 |
| Stabilizer (gms.) | 0.47 | 1.25 | 1.75 |
| Cure time (min.) | 3 | 3 | 5 |
| Cure temperature (°F.) | 250 | 250 | 250 |
| Hardness | — | 93 | 92 |
| Gardner Impact (in.-lbs.) | 0 | 6 | >4 |
| Heat Distortion Temp. (°C.) | — | 150 | 140 |
| Physical appearance | Dark yellow, transparent, rigid with bubbles | Light yellow tint, transparent, rigid | Clear, transparent, rigid |

EXAMPLES 74 TO 80

These Examples demonstrate the use of various epoxides and polyols in the composition.

The amounts of epoxide, polyol, catalyst, and 1,5-dicyanopentane and/or oleyl nitrile stabilizer, as shown in Table XIII, were mixed at room temperature (about 25° C.) and poured into a glass mold, as described in Examples 1 to 4, preheated to the cure temperatures as shown in Table XIII. The mold was then placed in an oven at the temperatures and cure times shown in Table XIII. A cured plaque was removed from the oven and tested to determine hardness, Gardner impact and heat distortion temperature. The physical appearance of the plaque was also noted.

The results are shown in Table XIII.

TABLE XIII

| Ingredients | 74 | 75 | 76 | 77 | 78 | 79 | 80 |
|---|---|---|---|---|---|---|---|
| Epoxide I (gms.) | 38.5 | 50 | 50 | 65.9 | 62 | 34.3 | 34.3 |
| Epoxide III (gms.) | — | — | 5 | — | — | — | — |
| Epoxide IV (gms.) | — | — | — | 3.47 | 7 | — | — |
| Polyol I (gms.) | — | — | — | 10 | 10 | — | 4.8 |
| Polyol II (gms.) | 12.5 | 5 | 5 | — | — | — | — |
| Polyol III (gms.) | — | — | — | — | — | 13.2 | 0.53 |
| Catalyst (gms.) | 0.21 | 0.21 | 0.21 | 0.32 | 0.32 | 0.19 | 0.16 |
| Oleyl nitrile (gms.) | 0.38 | 0.41 | 0.55 | 0.79 | 0.79 | — | — |
| 1,5-Dicyanopentane (gms.) | — | — | — | — | — | 0.12 | 0.10 |
| Molding conditions | | | | | | | |
| Cure time (mins.) | 3 | 3 | 3 | 3 | 3 | 3 | 3 |
| Cure temperature (°F.) | 250 | 250 | 250 | 250 | 250 | 250 | 250 |
| Properties of plaque | | | | | | | |
| Hardness | 92 | 94 | 93 | — | 93 | — | 93 |
| Gardner impact (in.-lbs.) | <4 | <4 | 4 | — | 4 | — | <4 |
| Heat distortion temp. (°C.) | 125 | 175 | 125 | — | 140 | — | — |
| Physical appearance | Yellow, transparent | Yellow, transparent | Clear, transparent | Clear, transparent, rigid | Clear, transparent, rigid | Clear, transparent, elastomeric | Clear, transparent flexible |

EXAMPLES 81 TO 89

These Examples demonstrate the use of various polyols and isocyanate containing stabilizers in the composition.

The amounts of epoxide, polyol, Catalyst and isocyanate stabilizer, as shown in Table XIV, were mixed at room temperature (about 25° C.) and poured into a glass mold, as described in Examples 1 to 4, preheated to the cure temperatures as shown in Table XIV. The mold was then placed in an oven at the temperatures and cure times shown in Table XIV. A cured plaque was removed from the oven and tested to determine hardness, Gardner impact, and heat distortion temperature. The physical appearance of the plaque was also noted.

The results are shown in Table XIV.

TABLE XIV

| Ingredient | 81 | 82 | 83 | 84 | 85 |
|---|---|---|---|---|---|
| Epoxide I (gms.) | 68.5 | 68.5 | 82.2 | 68.5 | 34.25 |
| Polyol I (gms.) | 19.9 | — | — | — | 5 |
| Polyol IV (gms.) | — | — | — | 30.2 | — |
| Ethylene glycol (gms.) | — | 1.5 | 1.5 | — | — |
| Triethylene glycol (gms.) | — | 10.9 | 10.9 | — | — |
| Catalyst (gms.) | 0.35 | 0.32 | 0.38 | 0.35 | 0.18 |
| Toluene diisocyanate (gms.) | — | — | — | — | 0.78 |
| Desmodur isocyanate (gms.) | — | — | — | — | — |
| Isophorone diisocyanate (gms.) | — | — | — | — | — |
| 4,4'-Diphenylmethane diisocyanate (gms.) | — | 5.7 | 6.6 | 3.0 | — |
| 4,4'-Dicyclohexylmethane diisocyanate (gms.) | 0.88 | — | — | — | — |
| 1,5-Dicyanopentane | — | — | 0.38 | — | — |
| Molding conditions | | | | | |
| Cure time (min.) | 3 | 3 | 2 | 3 | 3 |
| Cure temperature (°F.) | 250 | 300 | 300 | 300 | 250 |
| Properties of plaque | | | | | |
| Hardness | 93 | 95 | 94 | 90 | 93 |
| Gardner impact (in.-lbs.) | 2 | <4 | 2 | 4 | — |
| Heat Distortion Temp. (°C.) | 130 | 150 | 130 | 100 | — |
| Physical Appearance | Yellow, transparent, rigid | Yellow, transparent, rigid | Light yellow, transparent, rigid | Light yellow, transparent | Yellow, transparent |

| Ingredient | 86 | 87 | 88 | 89 |
|---|---|---|---|---|
| Epoxide I (gms.) | 34.25 | 34.25 | 34.25 | 34.25 |
| Polyol I (gms.) | 5 | 5 | 5 | 5 |
| Polyol IV (gms.) | — | — | — | — |
| Ethylene glycol (gms.) | — | — | — | — |
| Triethylene glycol (gms.) | — | — | — | — |
| Catalyst (gms.) | 0.18 | 0.18 | 0.18 | 0.18 |
| Toluene diisocyanate (gms.) | 1.2 | — | — | — |
| Desmodur isocyanate (gms.) | — | — | — | 0.10 |
| Isophorone diisocyanate (gms.) | — | 0.98 | — | — |
| 4,4'-Diphenylmethane diisocyanate (gms.) | — | — | 2.0 | — |
| 4,4'-Dicyclohexylmethane diisocyanate (gms.) | — | — | — | — |

TABLE XIV-continued

| | | | | |
|---|---|---|---|---|
| 1,5-Dicyanopentane | — | — | — | — |
| Molding conditions | | | | |
| Cure time (min.) | 3 | 3 | 3 | 3 |
| Cure temperature (°F.) | 250 | 250 | 250 | 250 |
| Properties of plaque | | | | |
| Hardness | — | 93 | 94 | 94 |
| Gardner impact (in.-lbs.) | — | <4 | <4 | <4 |
| Heat Distortion Temp. (°C.) | — | 150 | 175 | 175 |
| Physical Appearance | Light yellow, transparent rigid | Clear, transparent | Clear, transparent | Clear, transparent |

EXAMPLES 90 TO 92

These Examples demonstrates a liquid injection molding process using compositions of the instant invention.

Epoxide I, Polyol I, Catalyst, and Stabilizer in the amounts shown in Table XV were weighed into the feed tank of a laboratory RIM machine and blended into a one-package system. An aluminum mold of 6½×6½ inches containing a thermocouple was preheated in an oven to the initial temperatures shown in Table XV. The mold was then removed from the oven and immediately filled with the blended ingredients by pumping the ingredients from the feed tank through a mixing chamber and then into the mold. The mold was then placed in an oven at the temperatures and cure times shown in Table XV. A cured plaque was removed from the mold and tested to determine hardness, Gardner impact and heat distortion temperature. The physical appearance of the plaque was also noted.

The results are shown in Table XV.

The data in the Table shows that the compositions of this invention can be molded using a one-package liquid injection system and the resulting plaques have good physical properties and appearance.

TABLE XV

| | 90 | 91 | 92 |
|---|---|---|---|
| Ingredients | | | |
| Epoxide I (gms.) | 137 | 137 | 137 |
| Polyol I (gms.) | 19.9 | 19.9 | 19.9 |
| Catalyst (gms.) | 4.7 | 4.7 | 4.7 |
| Stabilizer (gms.) | 0.63 | 0.63 | 0.94 |
| Molding conditions | | | |
| Initial mold temp. (°C.) | 111 | 121 | 118 |
| Cure time (min.) | 10 | 10 | 4 |
| Cure temperature (°C.) | 114 | 133 | 166 |
| Properties of plaque | | | |
| Hardness | 85 | 93 | 93 |
| Gardner impact (in.-lbs.) | <4 | <4 | <4 |
| Heat distortion temp. (°C.) | 75 | 160 | 160 |
| Physical appearance | Clear, transparent, rigid | Clear, transparent, rigid | Yellow, transparent, rigid |

EXAMPLES 93 TO 98

These Examples demonstrate a reaction molding process using a two component system.

In these Examples, Polyol I or a mixture of ethylene glycol and triethylene glycol in the amounts shown in Table XVI were placed in one feed tank (I) of a laboratory RIM machine. In a second feed tank (II) of the RIM device were placed Epoxide I, Catalyst and Stabilizer, in the amounts shown in Table XVI, were blended. The RIM machine was calibrated to feed a ratio of feed tank (II) contents to feed tank (I) contents of 6.85 to 1.0 to the mixing chamber. This ratio of components was pumped to the mixing chamber and then to the aluminum mold described in Examples 90 to 94. The mold was preheated in an oven to the initial temperature shown in Table XIV. The mold was then removed from the oven and immediately filled with the mixed components. The mold was then placed in an oven at the temperatures and cure times shown in Table XVI. A cured plaque was removed from the mold and tested to determine hardness, Gardner impact and heat distortion temperature. The physical appearance of the plaque was noted.

The results are shown in Table XVI.

The data in the Table shows that the composition of this invention can be molded by a two component injection system and the resulting plaques have good physical properties and appearance.

TABLE XVI

| | EXAMPLES | | | | | |
|---|---|---|---|---|---|---|
| | 93 | 94 | 95 | 96 | 97 | 98 |
| Ingredients | | | | | | |
| Epoxide I (gms.) | 137 | 137 | 152 | 152 | 685 | 685 |
| Polyol I (gms.) | 19.9 | 19.9 | — | — | 99.6 | — |
| Ethylene glycol (gms.) | — | — | 1.65 | 1.65 | — | 7.4 |
| Triethylene glycol (gms.) | — | — | 12.1 | 12.1 | — | 54.3 |
| Catalyst (gms.) | 0.63 | 1.26 | 1.32 | 1.32 | 3.1 | 3.0 |
| Stabilizer (gms.) | 4.7 | 4.7 | 5.0 | 5.0 | 23.6 | 22.4 |
| Molding conditions | | | | | | |
| Initial mold temp. (°C.) | 122 | 102 | 111 | 75 | 120 | 80 |
| Cure time (min.) | 5 | 6 | 2 | 5 | 4 | 5 |
| Cure temperature (°C.) | 128 | 121 | 156 | 101 | 131 | 136 |
| Properties of plaque | | | | | | |
| Hardness | 85 | 93 | 88 | 85 | 93 | 93 |
| Gardner impact (in.-lbs.) | 4 | 4 | 4 | 4 | 4 | 6 |
| Heat distortion temp. (°C.) | 60-75 | 160 | 160 | 160 | 140 | 140 |
| Physical appearance | Clear, trans- | Light yellow, | Light yellow, | Light yellow, | Light yellow, | Light yellow, |

TABLE XVI-continued

| | EXAMPLES | | | | |
|---|---|---|---|---|---|
| 93 | 94 | 95 | 96 | 97 | 98 |
| parent, light yellow tint | transparent, rigid | transparent, rigid | transparent, rigid | transparent, rigid | transparent, rigid |

What is claimed is:

1. A stabilized curable composition comprising a cycloaliphatic epoxide, a Bronsted or Lewis acid catalyst and a stabilizing amount of a compound containing at least one nitrile and/or isocyanate group.

2. A composition as in claim 1, wherein the cycloaliphatic epoxide is a cycloaliphatic diepoxide.

3. A composition as in claim 2, wherein the cycloaliphatic epoxide is selected from 3,4-epoxycyclohexylmethyl-3,4-epoxycyclohexane carboxylate, bis(3,4-epoxy-6-methylcyclohexylmethyl)adipate, bis(3,4-epoxycyclohexylmethyl)adipate, bis(2,3-epoxycyclopentyl)ether, vinyl cyclohexane diepoxide, 2-(3,4-epoxycyclohexyl)-5,5-spiro(2,3-epoxycyclohexane)-m-dioxane.

4. A composition as in claim 1, which contains an hydroxy containing compound.

5. A composition as in claim 4, wherein the hydroxy containing compound is a glycol or a polyol.

6. A composition as in claim 5, wherein the glycol or polyol is selected from ethylene glycol, diethylene glycol, 2,2,4-trimethyl-1,3-pentanediol, dipropylene glycol, propylene glycol, 2,2-dimethyl-1,3-propanediol, polypropylene glycol having an average molecular weight of about 150 to about 600, and having 2 to 4 terminal hydroxyl groups, triethylene glycol, 1,4-cyclohexanedimethanol, 2,2-dimethyl-3-hydroxypropyl 2,2-dimethyl-3-hydroxypropionate, 1,3-butanediol, tetraethylene glycol, trimethylol propane, 1,4-butanediol, 1,6-hexanediol, tripropylene glycol, 1,2,6-hexanetriol, 1,3-propanediol and the ethylene and propylene oxide adducts of 2,2-bis(4-hydroxyphenyl)propane.

7. A composition as in claim 5, wherein the polyol is selected from the polycaprolactone ester of a polyol in which from about 1 to about 5 mols of caprolactone are esterified with trimethylol propane or diethylene glycol.

8. A composition as in claim 5, wherein the polyol is an ester diol alkoxylate.

9. A composition as in claim 1, wherein the Bronsted or Lewis acid catalyst is selected from the stannous salt of trifluorosulfonic acid, diethylammonium salt of trifluorosulfonic acid, trifluorosulfonic acid, boron trifluoride etherate, and a boron trifluoride amine.

10. A composition as in claim 9 wherein the catalyst is $(CF_3SO_3)_2Sn$.

11. A composition as in claim 1, wherein the compound containing nitrile group is monomeric or polymeric.

12. A composition as in claim 11, wherein the monomeric nitrile is selected from alkyl nitriles, aromatic nitriles, vinyl nitriles and acrylonitrile.

13. A composition as in claim 12, wherein the monomeric nitrile is selected from acetonitrile, methoxyacrylonitrile, 1,5-dicyanopentane, isobutyronitrile, 4-phenylbutyronitrile, 2-chloroacrylonitrile, phenyl acetonitrile, hydracrylonitrile, o-tolunitrile, dodecyl nitrile, oleylnitrile, isophthalonitrile and phenyl-sulfonylacetonitrile.

14. A composition as in claim 12, wherein the monomeric nitrile is 2-ethylhexyl-2-cyano-3,3'-diphenyl acrylate.

15. A composition as in claim 11, wherein the polymeric nitrile is selected from styrene/acrylonitrile copolymer, acrylonitrile/butadiene copolymer and polyacrylonitrile.

16. A composition as in claim 1, wherein the compound containing an isocyanate group is a mono-, di- or polyfunctional isocyanate.

17. A composition as in claim 16, wherein the compound containing the isocyanate group is a polyfunctional aliphatic isocyanate having an isocyanate content of about 23 percent and an average equivalent weight of about 183.

18. A composition as in claim 16, wherein the compound containing the isocyanate group is selected from 4,4'-diphenylmethane diisocyanate, 4,4'-dicyclohexylmethane diisocyanate, toluene diisocyanate, isophorone diisocyanate and 1,5-dicyanopentane.

19. A composition as in claim 1, wherein the stabilizing amount of the nitrile compound is from about 0.25 to about 50 equivalents of nitrile based in the moles of active catalyst.

20. A composition as in claim 19, wherein the stabilizing amount is from about 1 to about 20 equivalents of nitrile based on the moles of active catalyst.

21. A composition as in claim 1, wherein the stabilizing amount of the compound containing an isocyanate group is from about 1 to about 150 equivalents of isocyanate based on the moles of active catalyst.

22. A composition as in claim 21, wherein the stabilizing amount is from about 5 to about 150 equivalents of isocyanate based on the moles of active catalyst.

23. A composition as in claim 1, which contain a fiber selected from fiberglass, carbon fibers, and aromatic polyamide fibers.

24. A molded article produced from the composition of claim 1.

25. A molded article as in claim 24, which contains from about 15 to about 75 weight percent of fibers.

26. A molded article as in claim 25, wherein the fiber is fiberglass.

* * * * *